United States Patent [19]

Quitman

[11] 3,869,973
[45] Mar. 11, 1975

[54] GRILL FOR MAKING SEALED TOASTED SANDWICHES

[76] Inventor: Myron A. Quitman, 1459 Hewlett Ave., Hewlett, N.Y. 11557

[22] Filed: Feb. 7, 1973

[21] Appl. No.: 330,444

[52] U.S. Cl. .................................. 99/426, 99/374
[51] Int. Cl. ........................ A47j 37/01, A47j 43/20
[58] Field of Search ............ 99/426, 427, 354, 372, 99/374–376, 377, 379, 380, 381, 382, 383, 384, 428, 439, 441–442, 450.4, 349, 351; 249/92, 121, 136, 163

[56] References Cited
UNITED STATES PATENTS

| | | | |
|---|---|---|---|
| 1,168,819 | 1/1916 | Mildt | 249/121 X |
| 1,758,121 | 5/1930 | Lines | 99/379 |
| 1,939,017 | 12/1933 | Naeve | 99/380 X |
| 2,216,984 | 10/1940 | Pearson | 99/426 UX |
| 2,230,728 | 2/1941 | Propernick | 99/372 X |
| 2,358,452 | 9/1944 | Garstang | 99/380 X |
| 2,665,630 | 1/1954 | Allbright | 99/351 |
| 2,899,888 | 8/1959 | Koci | 99/376 X |
| 3,172,999 | 3/1965 | Sutton et al. | 99/376 X |

Primary Examiner—Robert W. Jenkins
Assistant Examiner—Arthur O. Henderson
Attorney, Agent, or Firm—Jackson, Jackson & Chovanes

[57] ABSTRACT

A grill for making sealed toasted sandwiches has upper and lower mold plates, the upper plates supported in an upper housing section and the lower mold plates supported in a lower housing section. Each upper mold plate cooperates with a lower mold plate, when the housing sections are heated and in snug engagement, to make one sealed toasted sandwich by compressing its marginal areas and shaping its interior areas. One or both mold plates are pocketed. The peripheral edge of each lower mold plate is surrounded by a flared rim or sleeve, uplifted from the mold plate and snugly contacting this edge and, during operation of the device, the peripheral edge of the cooperating mold plate also. Each flared sleeve serves to confine the sandwich ingredients placed within it above its lower mold plate and also to shape the peripheral edge of the sandwich formed by these ingredients.

3 Claims, 21 Drawing Figures

GRILL FOR MAKING SEALED TOASTED SANDWICHES

DISCLOSURE OF INVENTION

The invention relates to improvements in a grill for making toasted sandwiches.

The grill of the invention has upper and lower mold plates, the upper mold plates supported in an upper housing section and the lower mold plates being supported in a lower housing section. Each upper mold plate cooperates with a lower mold plate when the housing sections are heated and in snug engagement, to make one sealed toasted sandwich by compressing its marginal areas and shaping its interior areas. One or both members of each pair of cooperating mold plates are pocketed. The peripheral edge of each lower mold plate is surrounded by a flared rim or sleeve, uplifted from the plate and snugly contacting this edge and, during operation of the device, snugly contacting also the peripheral edge of the cooperating mold plate. Each flared sleeve serves to confine the sandwich ingredients placed within it directly above its lower mold plate and also to shape the peripheral edge of the sandwich formed by these ingredients.

In the preferred embodiment, the flared sleeve may be removed from contact with its lower mold plate in order to facilitate the removal of the completed sandwich. Also, in the preferred embodiment, there are three networks, one attached to the upper housing and supporting the upper mold plates and two attached to the lower housing, one of which supports the lower mold plates and the other supports the flared sleeves. Each network is removable from the housing section to which it is attached.

Mounted within the lower housing there are one or more vessels or wells adapted to hold water or flavored liquids and to permit these to evaporate into the interior of the device during its heating. The snugly engaged upper and lower housing sections are adapted to be drawn toward each other to fixed relative positions which may be accurately regulated by spacers or other means. A skirt is attached to the housing to promote efficient heating when external means of heating are employed. Insulated legs may be substituted for the skirt on versions of the device which are heated by internal means.

The present invention makes structural additions or improvements in grills of the type designed to make sealed toasted sandwiches. These additions and improvements result in improved efficiency, greater economy and ease of operation, adaptability to more widely varying heat sources, a wider variety in the products and more appetizing products. The device is nevertheless simple and inexpensive to manufacture and repair.

It requires less labor and less watching than previous devices of this class to make like quantities of sandwiches. It operates with little or no waste of materials. For the foregoing reasons, it is ideal for home, office, commercial and industrial use.

My device contains at least one pair of cooperating mold plates. The lower member of each pair possesses a novel flared rim or sleeve snugly contacting its periphery, in fixed position relative to it, relatively deep compared to the marginal rims or flanges of prior art devices and uplifted from the sandwich contacting face of the member. The upper member possesses no rim whatsoever. These novel features of a flared deep rim or sleeve and a rimless plate permit the following novel operations:

1. Each of the slices and the filling for each sandwich may be dropped into the flare of the appropriate concavity formed by a rim and its snugly contacting lower plate. The flare thus permits a rapid centering of the slices and filling within the concavity. This process of assembling the ingredients for each sandwich is of necessity slower when prior grills of this type are utilized.

2. Crusts do not protrude past the rims of my device as cooperating mold plates approach each other. The slices of bread for each sandwich are entirely confined within the rim. Extremely wasteful trimming of the slices is thereby eliminated. There is no need to collect and dispose of trimmed crusts and crumbs derived from them. The present device consequently saves time, labor and material.

3. Each concavity formed by a lower mold plate and an uplifted flared rim or sleeve is adapted because of its depth to completely contain two or more uncompressed slices of bread and the filling between the pairs of adjacent slices. The present device can thus efficiently produce sealed sandwiches, each made from two or more slices of bread or similar dough products.

4. The present device holds the ingredients for each sandwich in proper position and completely within the concavity even before the application of pressure. Previous devices of this class do not hold these ingredients securely at this stage of operation because they are not completely confined until the application of ppressure by the cooperating mold plates.

The present device is the only one adapted to hold the ingredients for each sandwich securely in place during the entire period of operation, from the time the ingredients are positioned within it until the completion of the sealed toasted sandwich. In prior devices these often move out of proper position when the device is jarred before its closing or when it is closed carelessly or hurriedly as is common in mass production.

5. The novel rim or sleeve of my device also enables it to operate in a satisfactory manner when one or both members of each pair of cooperating mold plates are shallow or when one member is completely flat. Regardless of the set of plates used, all of the ingredients for each sandwich will be held securely in proper position entirely contained within the concavity described above after their placement therein and for the entire period of operation.

The device makes a separate sealed toasted sandwich within each sleeve during each operation. Its sandwiches do not require manual separation, often with consequent mutilation, as is the case with prior art devices adapted to make a plurality of sandwiches in a single operation. Such separation always results in quantities of crumbs which must be gathered and discarded and furthermore results in a waste of time and materials. These prior art devices are therefore inefficient and unnecessarily slow to operate. My device, on the other hand, is adapted to make one or a plurality of toasted sandwiches in one operation efficiently and rapidly.

In the invention I have shown various forms which are themselves suggestive of various other forms.

In one embodiment shown, generally designated as a smaller embodiment, the mold plates, being few in number, may be removable singly from the housing in order to permit replacement by another set and to facilitate cleaning. In a larger embodiment, also shown, the mold plates are more numerous and may not be singly removable from their respective sections of the housing. Those in the upper housing section may be mounted in a network which is bolted to that section. There is a space above this network and the attached mounts to permit the passage of hot air to the upper surfaces of the mold plates in this section. In the larger embodiment shown, the lower mold plates are similarly supported by a network with space provided below it and the mounts to accommodate a source of heat, such as an electric element, and to permit the passage of hot air. After the removal of the networks from the housing, each mold plate may be removable from its network to facilitate cleaning and to permit its replacement by another plate.

In the smaller embodiment, the flared sleeve within which each lower mold plate is attached may also serve as the mount for this plate since it preferably does not separate from this plate as it may in the larger embodiment. Space for the passage of hot air into the lower part of each sleeve and then under each lower mold plate may be provided as shown. Space is also provided for the passage of hot air above and into each mount for an upper mold plate and thereupon into the area above the upper mold plate. On the other hand, each flared sleeve may separate from the peripheral edge of its lower mold plate in the larger embodiment in order to provide for easy cleaning and moreover for more rapid and easy removal of relatively large numbers of sealed sandwiches, some of which may stick. To rapidly accomplish this separation, the flared sleeves may be attached to a network which is removable from the lower housing section.

It will be seen that in the present invention there is a housing of minimal size which is adapted to retain heat and to be heated uniformly in order to promote efficient operation. Its interior and the parts thereof are therefore adapted in structure and position to permit uniform and rapid circulation of heated air to all sandwich contacting parts.

My novel skirt, when the device uses heat sources external to the housing, minimizes the waste of heat by catching it and slowing its outward and subsequent upward flow from the exterior of the bottom wall of the housing into the surrounding air and also by reducing the conduction of heat from the housing bottom to the cooler supporting surfaces, which it achieves by raising the bottom above them. The skirt therefore promotes more efficient operation in conjunction with externally applied heat. It is attached to the device when the housing is to be heated by external means and projects below the housing bottom wall continuously from every point on its periphery.

The heating means may be flames or hot objects such as an electric heating element. Whether external or internal, the heat source does not contact any of the sandwich-contacting parts. The construction of the device thus facilitates uniform heating of the air inside the housing. The hot air interior to the housing in turn heats the sandwich-contacting parts uniformly. There is little or no danger of burning the sandwiches. The prior devices in this class which are intended for such uniform heating use only the electric source. Their elements are embedded in or attached to each mold plate. This localization of the heating means is undesirable since it makes these devices expensive to manufacture and repair. My device, the only one which is uniformly heated by flames, is consequently an improvement over other devices of this class which are adapted to be heated by flames because it does not require the time-consuming labor of carefully positioning and frequently repositioning it over the flames. Nor will it require frequent opening, for inspection of the articles being heated lest they burn, and frequent turning or other types of repositioning to guarantee even heating, all of which are wasteful of heat.

My device is also the only one of which I am aware which is adapted to be uniformly heated on an external electric stove. When this manner of heating is employed, advantages similar to those described in connection with fuel heating accrue. Moreover, my device does not require relatively thick mold plates with the disadvantages of slow heating.

When external heating is applied, the device, because of its skirt and its housing which evenly distributes the heat to the interior sandwich contacting surfaces, does not require specially constructed stoves or specially positioned burners. Ordinary stoves produced for homes or stores are satisfactory. Wide adaptation to various forms of heating makes the device very attractive to most people.

Prior devices of this class are more difficult in many respects to manufacture and to repair. My device is made from readily available parts and materials. It is easily adapted for an internal continuous electric heating element, shielded or unshielded. In case of failure or breakage of such an element, it is easily and inexpensively replaced.

My device produces more palatable products and a greater profusion of these than prior devices. The type of bread or other dough product used, the number and thickness of the slices in each sandwich of a batch, and the kinds and amount of filling included in each sandwich may vary widely when my device is employed. Its novel flare, deep sleeves and rimless upper mold plates in part make this possible. The contours of the sandwiches produced also may vary because it is equipped with a variety of sets of interchangeable mold plates. Prior art devices cannot produce sandwiches of such variety.

Nor can sealed sandwiches in such a profusion of forms be produced by a device adapted to yield marginal seals of a single uniform thickness. Some seals of a particular thickness are brittle and unpalatable. Some seals of this particular thickness would not be effective. The number and thickness of the slices of dough product also have a bearing on the thickness of the marginal seal of the completed sandwich. Differences in the uniform thickness of the marginal seals between batches of sandwiches are therefore often necessary. My device can be precisely regulated to produce sandwiches, each batch having marginal seals of a selected uniform thickness. The thickness selected may vary for different batches of sandwiches. This precise regulation may be accomplished by the use of accurately machined spacers in a plurality of sets, by hydraulic means, or by other means. Such regulation is necessary if sandwiches in great variety are to be produced and all are to bear marginal seals which are both palatable and effective.

The palatability of the products of the present device is further enhanced by means of its novel wells. These are capped vessels for water or flavored liquid, one or a plurality of which are attached to the interior of the housing. Each well is filled by removing its cap and pouring in the liquid. The heat in the oven causes the liquid to evaporate through a hole in the cap. This extra vapor within the oven penetrates the sandwiches in production. When completed, these are more palatable because the marginal seal and the covering of each has a very fresh taste and consistency and, if flavoring has also been used, a special flavor which is appealing to the taste.

Describing first the smaller embodiment of FIGS. 1 to 6, a bottom half of the housing 30 telescopes with respect to the top half of the housing 31. The bottom 30 has flanges 32, a side wall 33 and a bottom wall 34. The top portion of the housing 31 has flanges 35 which cooperate with the flanges 32 of the bottom half, a side wall 36 and a top wall 37. The side walls 33 and 36 telescope with respect to one another. Within the bottom half 30 and spaced from its walls is a combined sleeve and plate support 40 which is supported in spaced relations from the bottom 34 by lugs 41 so that there is circulation of air between the bottom 34 and the combined sleeve and plate support 40. At the top edge of the plate support is an outwardly flaring skirt 42. Within the plate support 40 is a horizontal bottom plate 43 which is suitably pocketed at 43' at the center to provide a space for filling and the like of sandwiches.

Depending from the upper housing half 31 is an upper plate support 44 which is supported by bolts through lugs 45 and which is spaced from the housing lid 37 by the lugs 45. The upper plate support 44 telescopes within the lower plate support 40 and at the lower end has upper plate 46 which is pocketed at 47 so as to provide a space for filling or the like in the toasted sandwich. The lugs 41 and 45 mount the plate supports through suitable holes to the housing halves. It will be evident that the plates stand opposed to one another to form and seal the edges of the sandwich by forming the bread under suitable pressure between the opposed edges of the plates 43 and 46.

In the larger embodiment a bottom housing section 60 and a top housing section 61 telescope with respect to one another at the side walls. In the bottom section 60 there are side walls 63, a bottom wall 64 and a flange 65. The top housing section 61 has a top wall 62 and a side wall 66 which telescopes with respect to the side wall 63 of the bottom section 60 and which is surmounted by a flange 67 which is opposed to a flange 65 on the bottom section 60. In the housing bottom half 60 is a network 70 which supports a combined bottom plate support and sleeve 71 which carries a flare 72 at the top. Attached to the lower plate support and sleeve 71 there is a lower plate 73 which is supported by abutment 74 within the plate support and which preferably has a pocket 75 at the center.

Figures 1, 2:
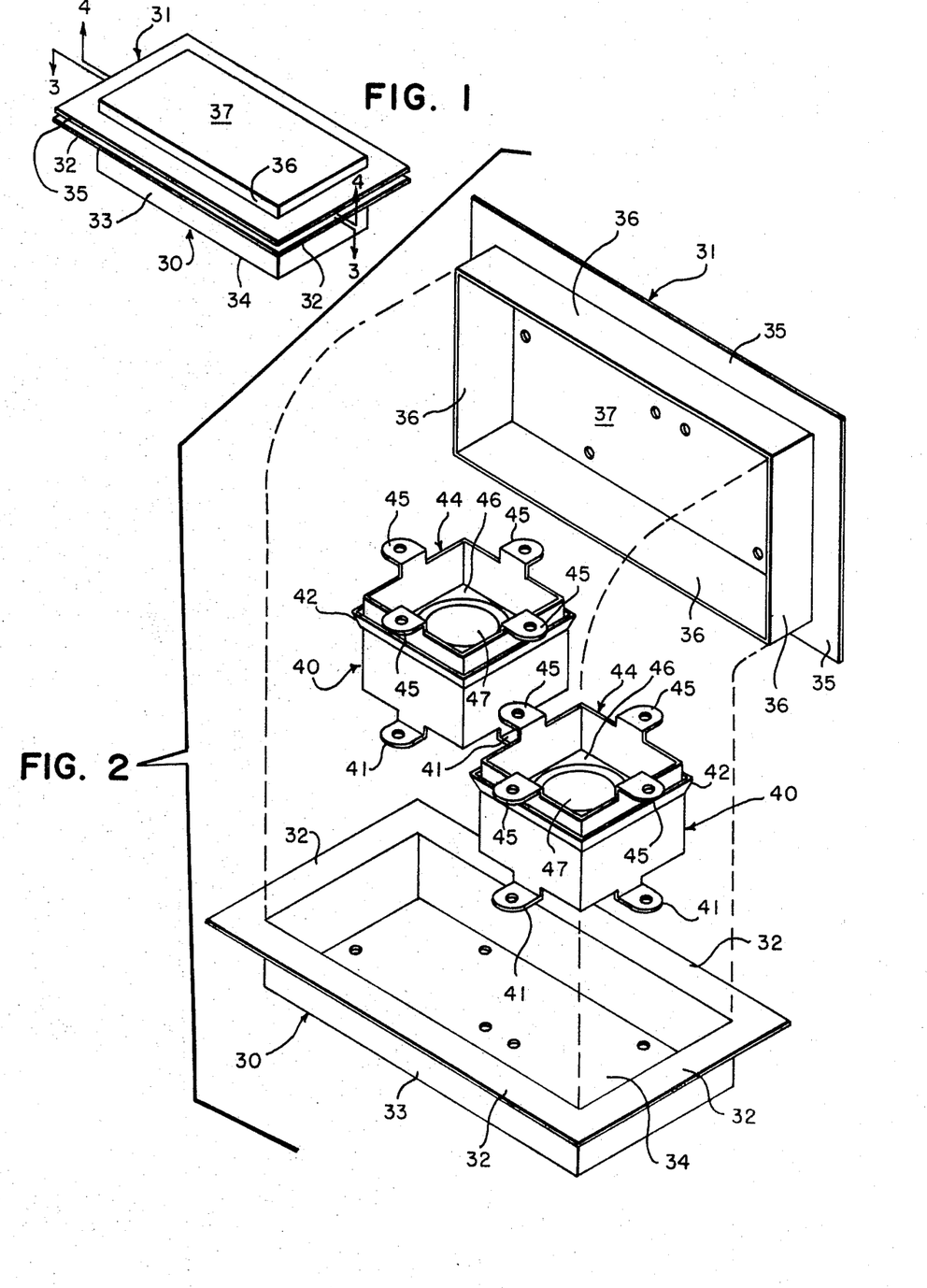
FIG. 1 shows the smaller embodiment in perspective minus the handles and other parts exterior to the housing.
FIG. 2 is an exploded perspective of FIG. 1.
Figure 3:
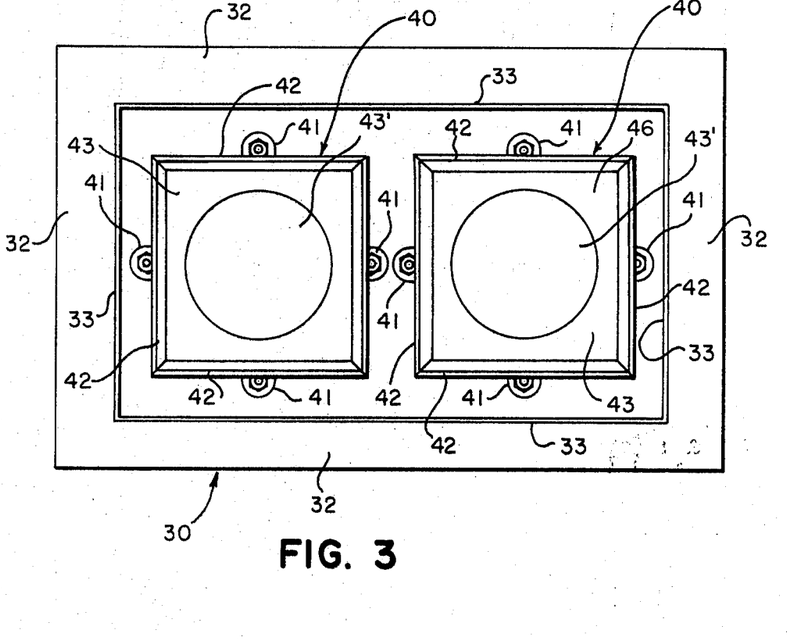
FIG. 3 is a section of FIG. 1 on the line 3—3.
Figure 4:
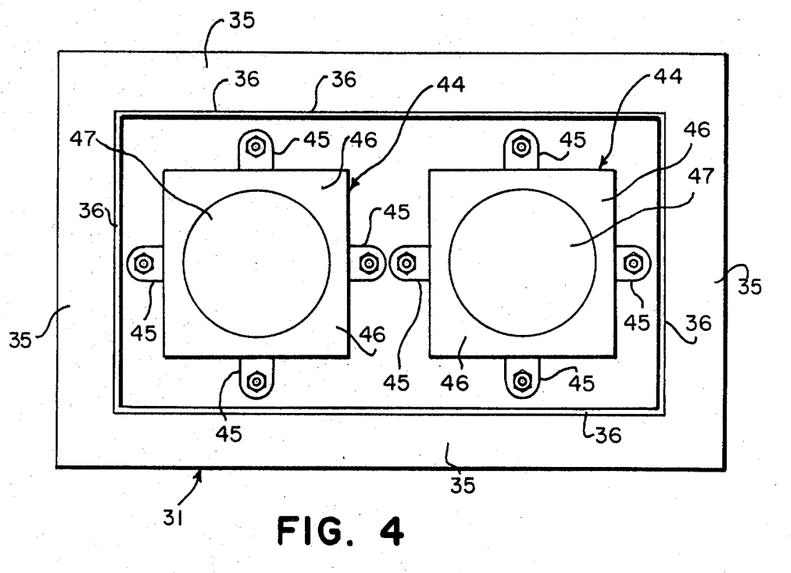
FIG. 4 is a section of FIG. 1 on the line 4—4.
Figure 5:
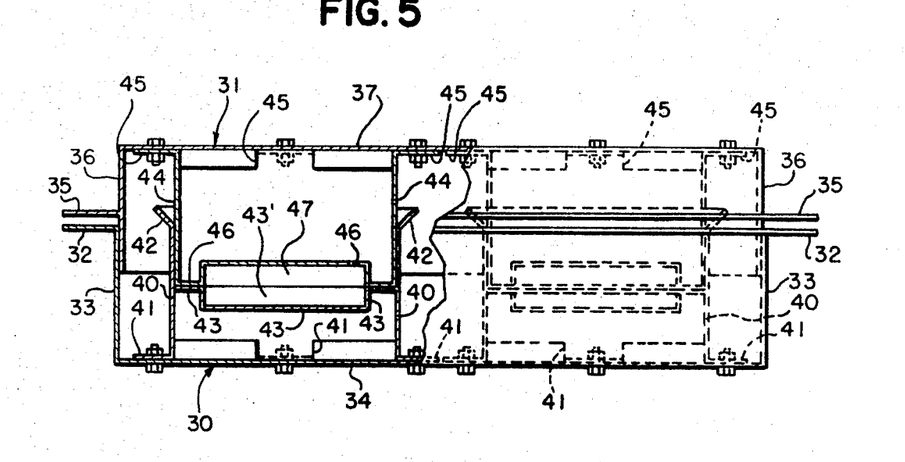
FIG. 5 is a broken side elevation of the assembled housing in operative position minus the bread and other materials.
Figure 6:
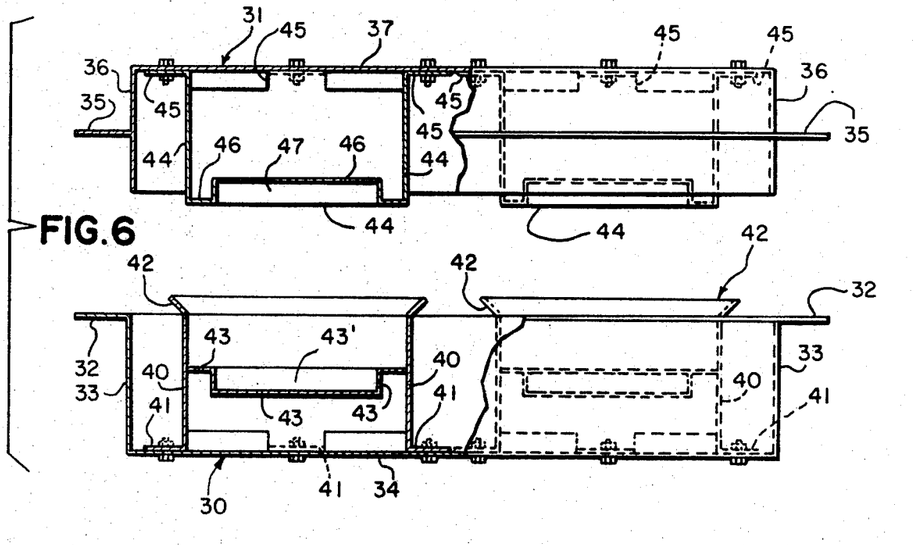
FIG. 6 is a view similar to FIG. 5 with the housing sections separated.
Figure 7:
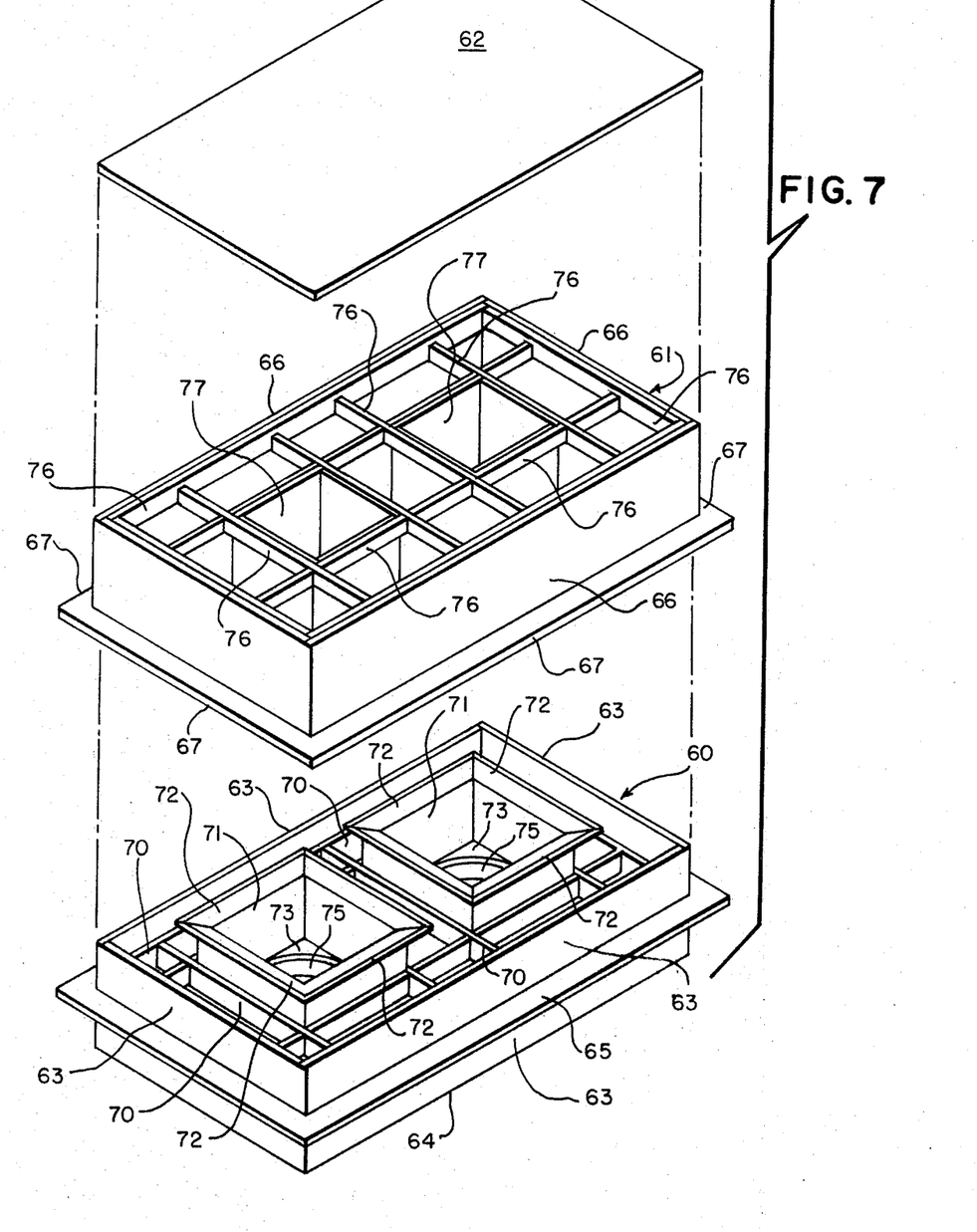
FIG. 7 is an exploded perspective view of the housing in the larger form.
Figure 8:
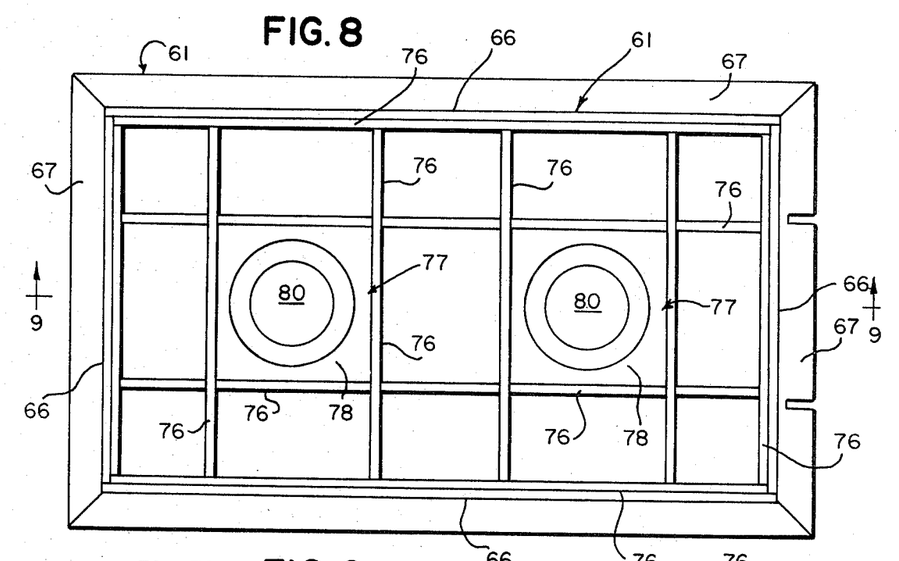
FIG. 8 is a bottom plan view of the upper half of the housing of FIG. 7.
Figure 9:
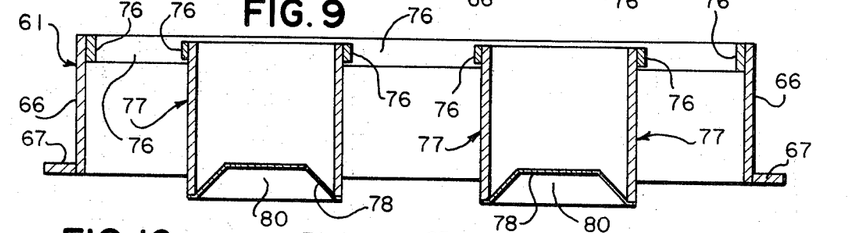
FIG. 9 is a section of the upper half of the housing of FIG. 7 on the line 9—9 of FIG. 8.
Figure 10:
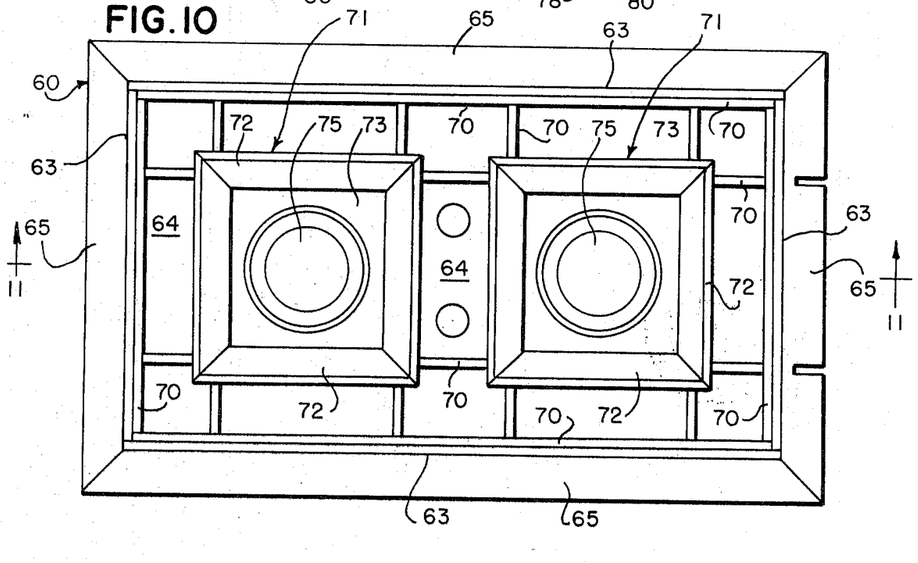
FIG. 10 is a top plan view of the lower half of the housing of FIG. 7.
Figure 13:
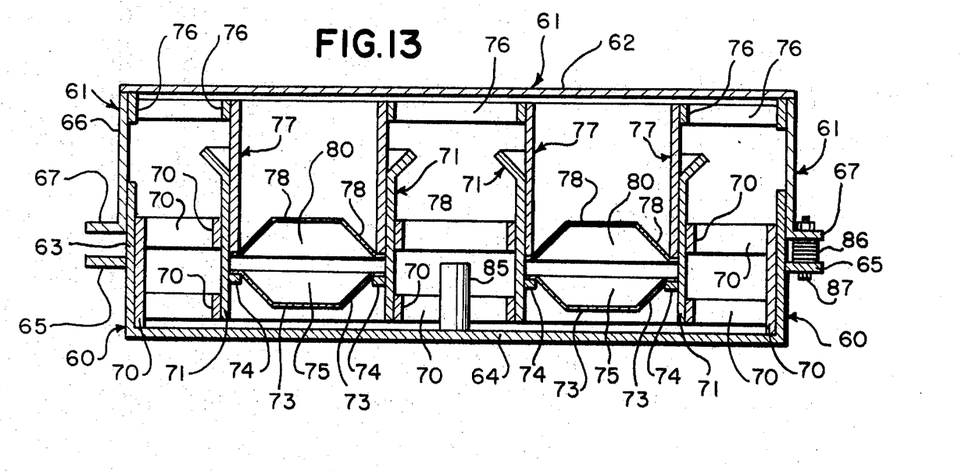
FIG. 13 is a sectional view of the assembled housing of FIG. 7 on the line 13—13 of FIG. 12.
Figure 13A:
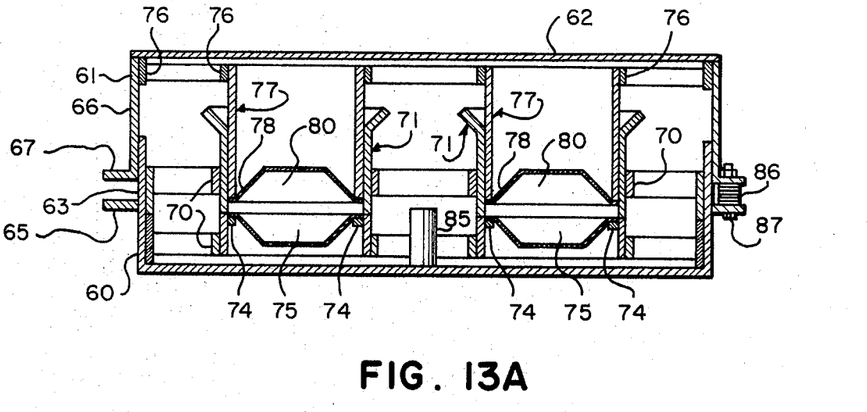
FIG. 13A is similar to FIG. 13, but shows the same modifications as does FIG. 11A.

Near the top of the upper housing half is a network 76 which supports a top plate support 77 which telescopes within the bottom plate support and sleeve 71 and which at its lower edge supports a plate 78 which preferably has a pocket 80.

Thus, you have, as shown in FIG. 13, cooperating spaced plates 73 and 78 adapted to be held in spaced relation, to bring pressure on the parts of the sandwich; and, under heat, to seal and mold the rim of the sandwich and to shape its interior area containing filling.

Attached to the interior of the housing in suitable places, such as between the spaced positions of the cooperating mold plates, there are wells or vessels 85 which contain odoriferous and savory materials, to be evaporated through a suitable hole in the top of the vessel.

Figures 14, 15, 15B, 16:
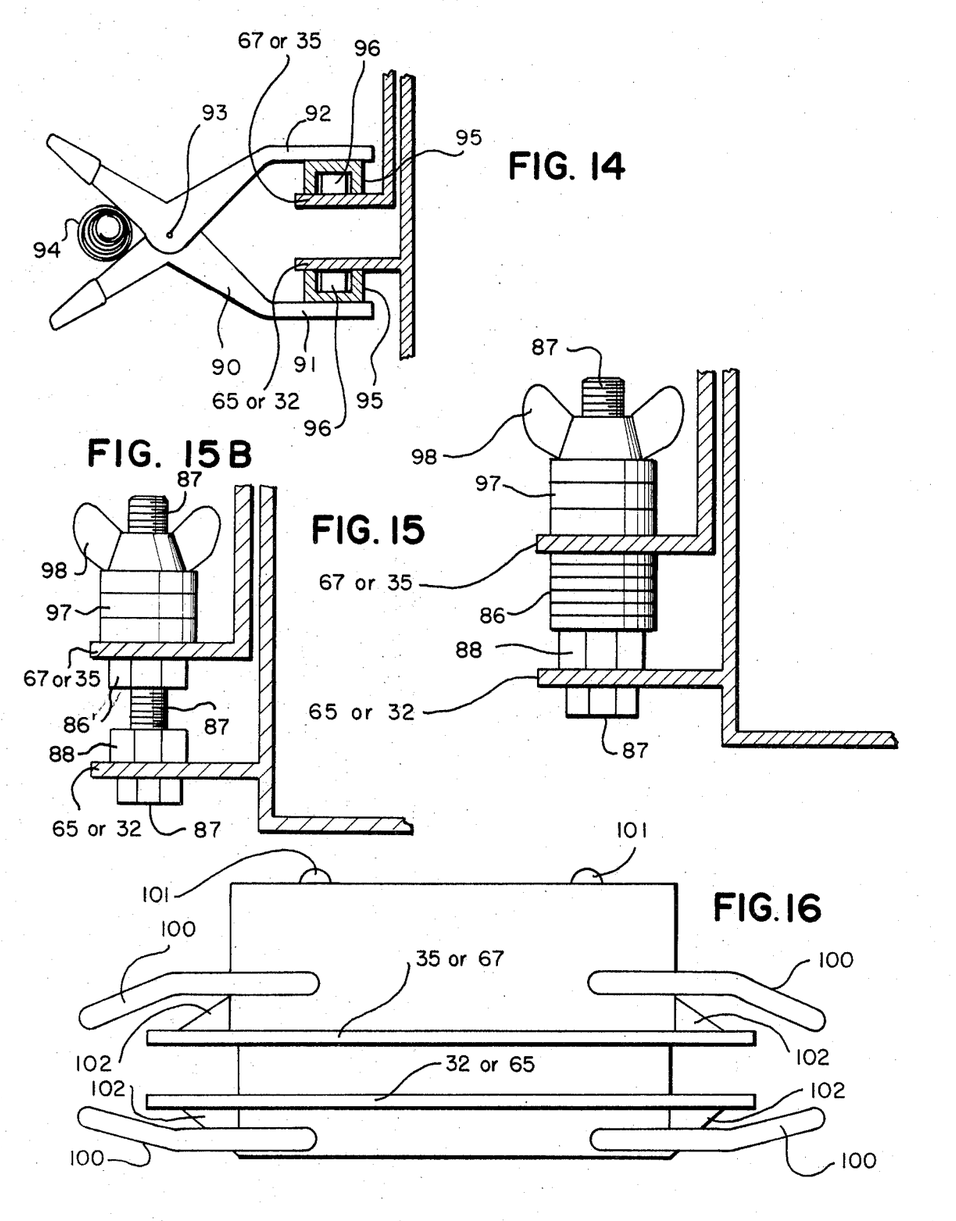
FIG. 14 is a vertical sectional view of clamps which may be applied to any of the previous forms of the invention.
FIG. 15 is a vertical sectional view of spacers which may be applied to any of the previous forms.
FIG. 15B shows a nut 86' replacing the spacers 86 of FIG. 15.
FIG. 16 shows any of the forms of the housing provided with handles.

At intervals between the flanges are sets of spacers 86, as shown in FIG. 15, each of which may contain a bolt 87. The bolt is attached to the flange 65 or 32 of the bottom housing section, preferably by means of a nut 88. The bolt penetrates the other flange 67 or 35. The two flanges may be brought together in suitable relationship, pressing firmly against the set of spacers, by means of a thumbscrew 98, with washers 97 between it and the flange 67 or 35 to minimize its turning on the bolt. If desired, a suitable ordinary nut may replace the thumbscrew and another ordinary nut 86' may replace the spacers 86.

Figure 15A:
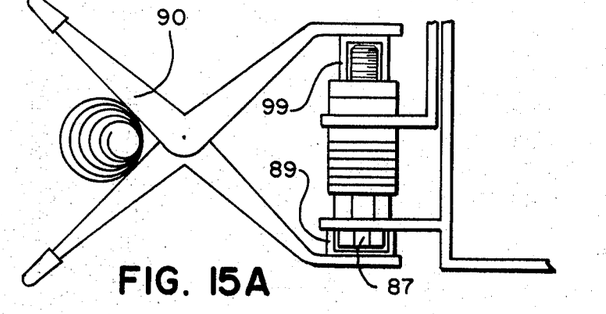
FIG. 15A shows the clamp of FIG. 14 adapted to fit over the ends of the bolt of FIG. 15, thereby replacing the thumbscrew.

If preferred, the flanges of the housing halves may be brought together in the relationship just described by means of clamps placed at intervals along the flanges, each clamp 90, as shown in FIG. 14, having arms 91 and 92 pivoted at 93 intermediate their length and having a spring 94. Attached to each arm at the housing end is a female fitting 95 engaging a male fitting 96 which is integral with one of the flanges. The use of these clamps would obviate the need for the washers and thumbscrews, or ordinary nuts, mentioned above. On the other hand, one arm of the clamp 90 may possess a female fitting 89 adapted to engage the head of the bolt 87 and the other arm a female fitting 99 adapted to engage the threaded end of the bolt, as shown in FIG. 15A.

Figure 11:
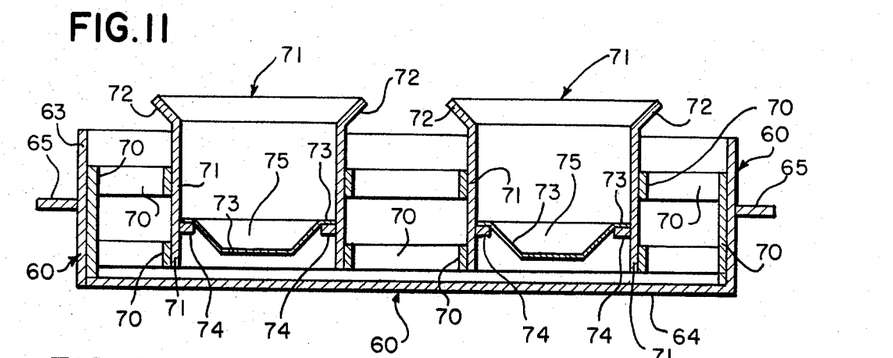
FIG. 11 is a sectional view of FIG. 10 on the line 11—11.
Figure 11A:
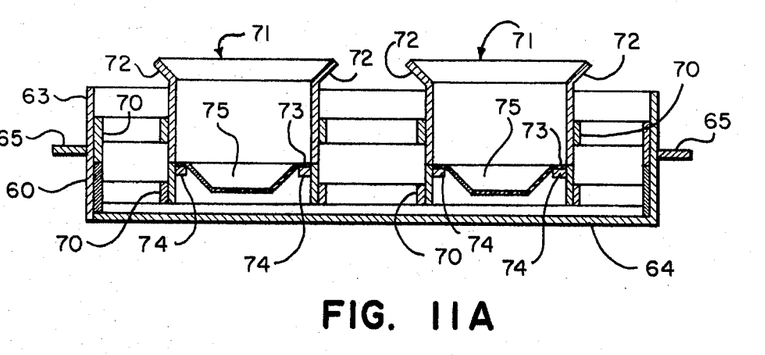
FIG. 11A is similar to FIG. 11, but shows the points where the supporting network is separated into two networks and where the sleeve portion of the combined bottom plate support and sleeve would separate from the plate support portion in some embodiments.
Figure 11B:
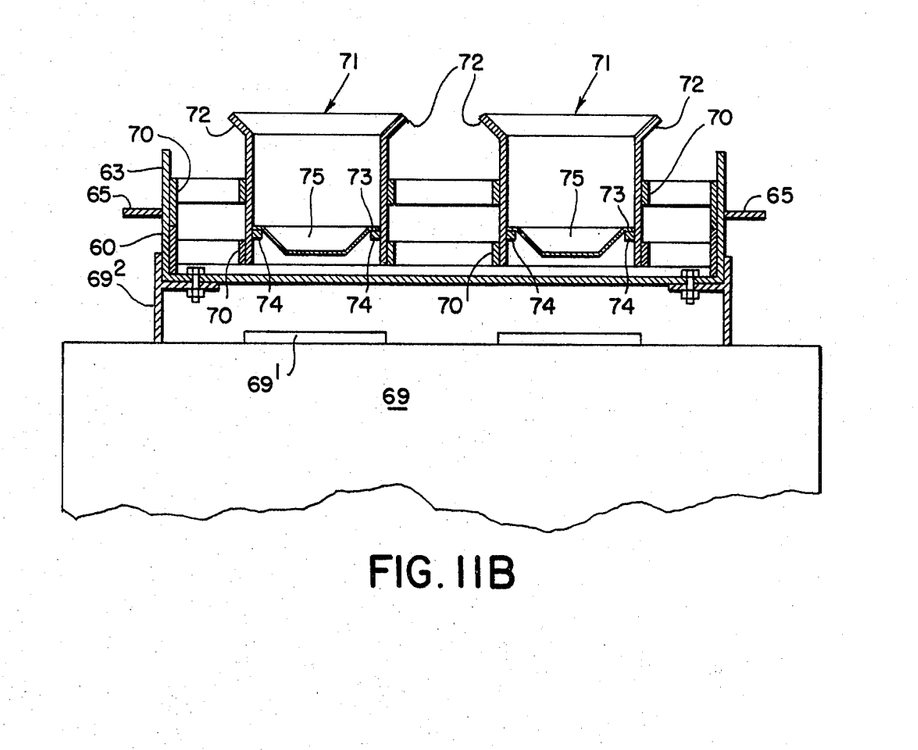
FIG. 11B is similar to FIG. 11A except that it relates to the skirt on the housing.
Figure 12:
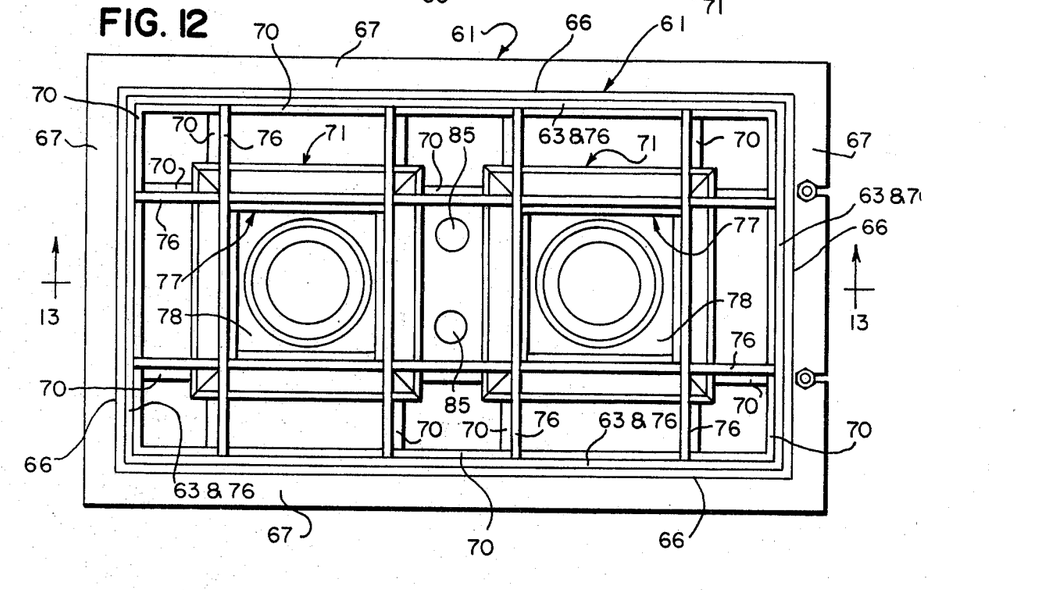
FIG. 12 is a top plan view of the assembled housing of FIG. 7 minus the top wall.

As shown in FIG. 16, the two housing sections may be provided with handles at 100. Each flange may be reinforced by pieces 102, each piece attached to the flange itself and to the side wall of its housing section. The device may have legs, not shown, supported on insulating feet which are not shown, especially when it is heated by internal means. In addition, the upper housing section may be provided with insulators 101 to prevent the marring or burning of surfaces on which it may rest in inverted position. When externally heated, the housing preferably will be without legs and feet and will be provided with a skirt to convey the hot gases toward the toasting area. FIG. 11B shows a gas or electric stove 69, with burners 69', and a housing surrounded by a skirt 69². The lower housing section may possibly be without a bottom wall when the heating means is external.

In operation, the hot gases from either an internal or an external source of heat, as desired, are conveyed into the spaces surrounding the mold plates. The pieces of bread or other dough product constituting a sandwich are supported horizontally as they undergo toasting, their marginal areas joined and molded to form a flat marginal rim which constitutes an effective seal. If neither of the two surfaces of the sandwich is to be completely flat, the area of each piece within its marginal area being sealed is molded outwardly and away from the center of the sandwich in order to create a pocket for filling between each pair of adjacent pieces, whether two or more than two pieces are in the sandwich. If one of the two surfaces of a sandwich is to be completely flat, one piece on its surface remains flat. The area of each of the others interior to the marginal area being sealed is molded outwardly and away from the center of this flat surface piece in order to create a pocket between each pair of adjacent pieces.

As the housing is heated, the liquids in the vessels attached within it vaporize. The vapors formed permeate the marginal rim and other areas of the sandwich.

It will be evident that the combination of the mold plate and the pocket within it provides a flat marginal area around the edge of the plate and that this plate and its cooperating plate, whether it also possesses a pocket and a flat marginal area or is complete flat, cooperatively seal the sandwich between them by molding a flat continuous rim on its marginal areas during the operation of this device.

In view of my invention and disclosure, variations and modifications to meet individual whim or particular need will doubtless become evident to others skilled in the art, to obtain all or part of the benefits of my invention without copying the structure shown, and I therefore claim all such insofar as they fall within the reasonable spirit and scope of my claims.

Having thus described my invention, what I claim is new and desire to secure by Letters Patent is:

1. In a grill for making sealed toasted sandwiches, a lower mold plate, an upper cooperating mold plate, both of the mold plates having flat marginal rims, a mount supporting the lower mold plate, a mount supporting the upper mold plate, a sleeve snugly engaging the edge of the lower mold plate, a lower housing section supporting the sleeve and the lower plate's mount, an upper housing section supporting the upper plate's mount, the housing sections telescoping in snug relationship and completely enclosing the mold plates, their mounts and the sleeve, the upper plate, followed by its mount and snugly engaged with the sleeve, simultaneously telescoping within the sleeve to a final position in which the flat marginal rims of the plates are at a uniform distance apart and in which the plates apply pressure to the ingredients within the sleeve and between them, and means for accurately regulating this uniform distance, in which there are networks, each attached to either the upper or the lower housing, to provide means of attachment to the housing for the lower mold plate's mount, the upper mold plate's mount and the sleeve.

2. In a grill for making sealed toasted sandwiches, a lower mold plate, a sleeve surrounding and snugly engaging the flat outer edge of the lower mold plate and supporting the plate, a lower housing supporting the sleeve, an upper mold plate within the sleeve, the flat outer edge of the upper mold plate snugly engaging the sleeve and conforming to the shape of the interior of the straight section of the sleeve, the upper mold plate cooperating with the lower mold plate to apply pressure on and mold the ingredients between them and within the sleeve, a mount for the upper mold plate telescoping within the sleeve, an upper housing section supporting the upper mold plate's mount, the snugly engaged lower and upper housing sections completely enclosing the lower and upper plates, the mount and the sleeve, means for exerting pressure on the upper mold plate and means for precisely regulating the pressure exerted, in combination with the vessel containing an odor producing material and a liquid for producing an odorous and a moist atmosphere in the housing during its heating.

3. In a grill for making sealed toasted sandwiches, a sleeve having a straight section of uniform cross section and a flared section above the straight section, a lower housing supporting the sleeve, a lower mold plate having a continuous marginal flat area, the straight section of the sleeve surrounding and snugly engaging the flat outer edge of the lower mold plate and supporting the plate, this outer edge conforming in shape to the interior of the straight section of the sleeve, an upper mold plate having a continuous marginal flat area, the straight section of the sleeve surrounding and snugly engaging the flat outer edge of the upper mold plate, this outer edge conforming in shape to the interior of the straight section of the sleeve, the lower and upper mold plates cooperating to apply pressure on and mold the ingredients between them and within the straight section of the sleeve, a mount for the upper mold plate telescoping within the sleeve, an upper housing section supporting this mount, the snugly engaged lower and upper housing sections completely enclosing the lower and upper mold plates, the mount and the sleeve, means for pressing the housing sections together and for forcing the upper mold plate into the sleeve and toward the lower mold plate, and means for precisely and finely regulating the relative positions of the lower and upper housing sections, in combination with a vessel containing an odor producing material and a liquid for producing an odorous and a moist atmosphere in the housing during its heating.

* * * * *